(12) United States Patent
Lin et al.

(10) Patent No.: US 6,992,727 B2
(45) Date of Patent: Jan. 31, 2006

(54) METHOD FOR DETECTING VIDEO FRAME TYPES WITH ADAPTIVE THRESHOLDS

(75) Inventors: Wen-Kuo Lin, Taipei (TW); Jong-Ho Yan, Shinying (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 551 days.

(21) Appl. No.: 10/323,671

(22) Filed: Dec. 20, 2002

(65) Prior Publication Data

US 2004/0119890 A1    Jun. 24, 2004

(51) Int. Cl.
*H04N 5/08* (2006.01)
(52) U.S. Cl. .................. 348/526; 348/526; 348/527; 348/558
(58) Field of Classification Search ........ 348/526–527, 348/555, 558, 665–670, 450–452; H04N 5/08
See application file for complete search history.

(56) References Cited

U.S. PATENT DOCUMENTS

| | | | | |
|---|---|---|---|---|
| 4,263,612 A | * | 4/1981 | Gibson et al. ............. 348/665 |
| 4,635,099 A | * | 1/1987 | Nicholson et al. .......... 348/555 |
| 4,646,133 A | * | 2/1987 | Blanchard et al. .......... 348/450 |
| 4,821,112 A | * | 4/1989 | Sakamoto et al. .......... 348/555 |
| 5,097,321 A | * | 3/1992 | Stern et al. ................. 348/450 |
| 5,166,781 A | * | 11/1992 | Walby et al. ............... 348/549 |
| 5,398,071 A | * | 3/1995 | Gove et al. ................. 348/558 |
| 5,606,373 A | * | 2/1997 | Dopp et al. ................. 348/459 |
| 6,160,589 A | * | 12/2000 | Sadowski .................... 348/526 |
| 6,281,939 B1 | * | 8/2001 | Del Castillo et al. ....... 348/558 |
| 6,545,725 B1 | * | 4/2003 | Fujita et al. ................ 348/604 |
| 6,700,622 B2 | * | 3/2004 | Adams et al. .............. 348/448 |
| 6,867,814 B2 | * | 3/2005 | Adams et al. .............. 348/448 |

\* cited by examiner

*Primary Examiner*—Brian P. Yenke
(74) *Attorney, Agent, or Firm*—Troxell Law Office, PLLC

(57) ABSTRACT

A method for detecting dynamic video pixels by using adaptive counter threshold values according to field difference value of the frame in the video, thereby to determine whether the frame is an interlaced frame or a progressive frame and to eliminate incorrect judgements resulting from field difference and to improve accuracy of frame determination.

6 Claims, 6 Drawing Sheets

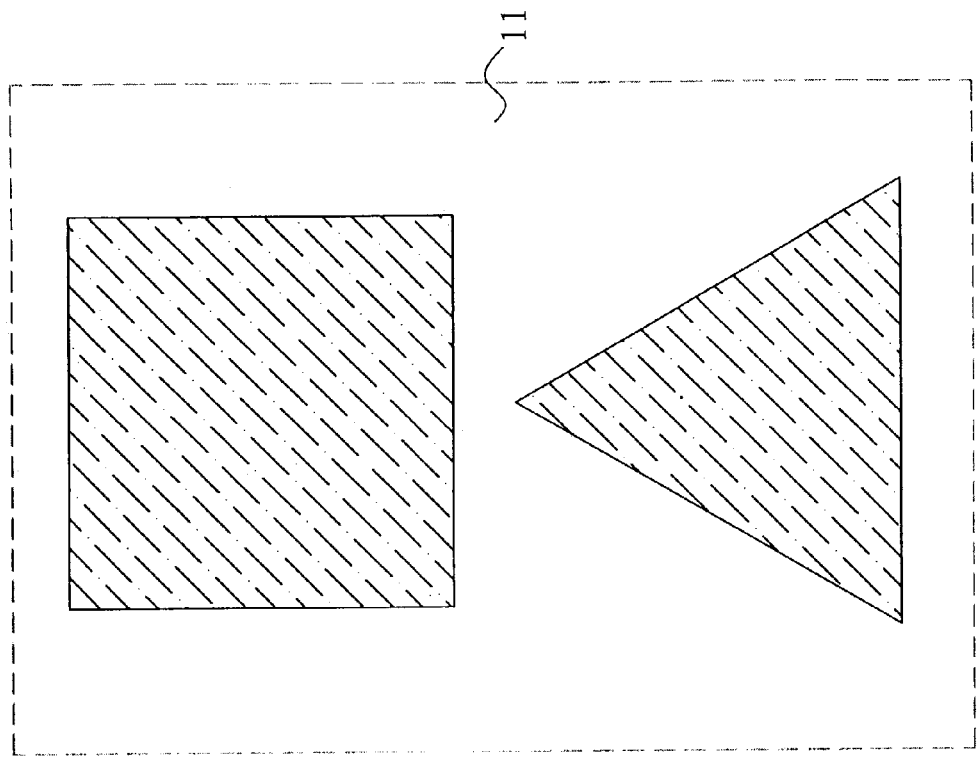
FIG. 1 (b) Prior Art,
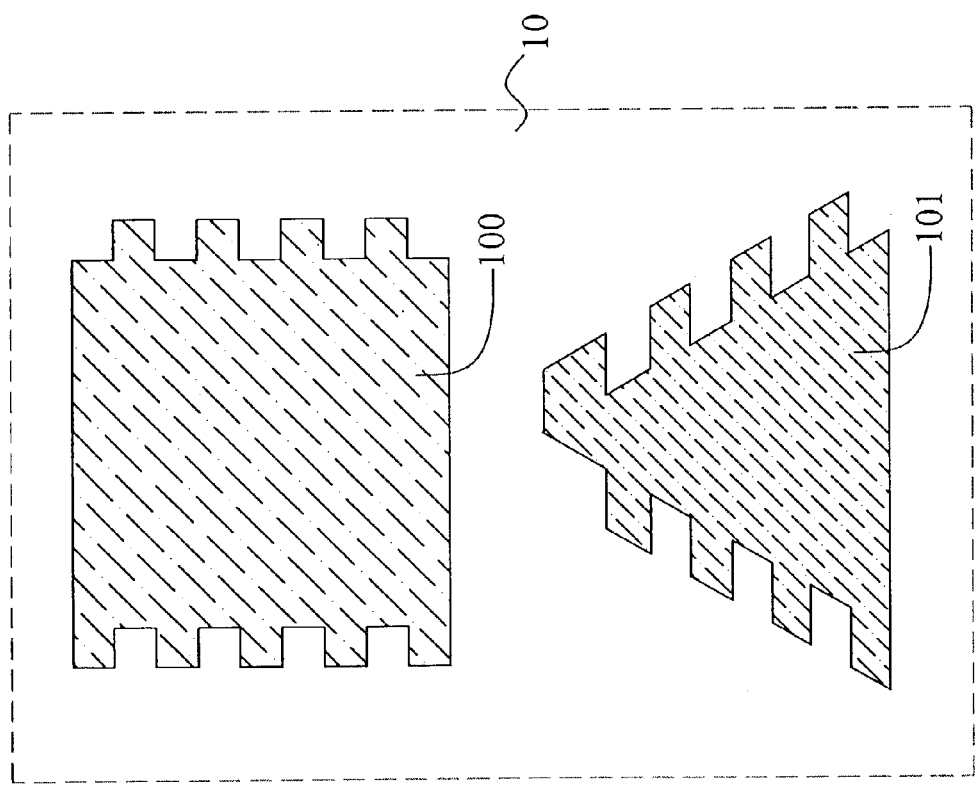
FIG. 1 (a) Prior Art,

METHOD FOR DETECTING VIDEO FRAME TYPES WITH ADAPTIVE THRESHOLDS

BACKGROUND OF THE INVENTION

1. Field of the Invention

The invention relates to a method for detecting video frame types with adaptive thresholds that determines whether a video frame is an interlaced frame or a progressive frame by using adaptive thresholds to avoid incorrect judgement of the frame type resulting from excessive field difference and improve detection accuracy.

2. Description of the Prior Art

The video picture that is commonly adopted at present is transmitted at thirty frames per second to produce continuous and dynamic images. Each frame consists of a plurality of scan lines (for instance, National Television System Committee—NTSC, standard is 525 scan lines). That is, 525 scan lines are transmitted in 1/30 second for one frame.

Said video frame can be classified into two categories: interlaced frame and progressive frame. Scanning of the interlaced frame is divided in a top-field and a bottom-field. The top-field has an odd number of scan lines while the bottom-field has an even number of scan lines. They are scanned separately at two times. For instance, the top-field is scanned first, then the bottom-field is scanned to generate a complete frame. On the other hand, all of the scanning lines of the progressive frame are transmitted at the same time, then are scanned individually one by one.

Refer to FIGS. 1(a) and 1(b) for an interlaced frame 10 and a progressive frame 11. As the interlaced frame 10 is scanned at different times and is transmitted respectively for the top-field (odd number of scan lines) and the bottom-field (even number of scan lines), a comb-shaped pattern is generated on the peripheral edges of the square picture 100 and the triangle picture 101 (generally called comb factor). The resolution is less desirable and video quality is poorer. On the other hand, the whole progressive frame 11 is transmitted at the same time, therefore the comb factor does not occur as shown in FIG. 1(a).

Based on previous discussion, it is obvious that the comb factor has great impact on resolution. Hence prior to video output, a detection process is performed to determine whether the input frame is an interlaced frame or a progressive frame. If the interlaced frame is detected, then a deinterlacing process is executed to remove the comb factor to obtain a higher quality video. If the progressive frame is detected, the video may be directly output without deinterlacing.

Refer to FIG. 2 for a conventional detection process. First, at step 201, set the comb factor counter to zero and input a frame F (n) at time instance "n" for calculating the comb factor of pixels; next, at step 202, transfer all of the pixels into the frame function F (n); at step 203, scan pixels in the raster order and calculate the comb factor of the pixels (the equation for calculating the comb factor will be discussed later); at step 204, determine whether the comb factor at each pixel is greater than the threshold value, if "yes", proceed step 205 and increase the value of comb factor counter by one; if "no", proceed step 206 to determine if it is the last pixel in the frame; if it is the last pixel, proceed step 207; if "no", repeat step 203 through step 206; at step 207, determine whether the value in the comb factor counter is smaller than a threshold value, if yes, the frame is judged as a progressive frame at step 208; if no (i.e. the counter value is greater than the threshold value), proceed step 209 and judge the frame as an interlaced frame; finally end the detection process for frame F(n).

FIG. 3 illustrates the calculation of a pixel comb factor at step 203 shown in FIG. 2. The pixel 30 to be calculated is located at the coordinate (x,y) and denoted as X in the picture. O-31 indicates a first adjacent pixel "b" and O-32 indicates a second adjacent pixel "e", then the equation for calculating the comb factor of the pixel 30 is as follows:

Comb Factor $(x,y)=(b-x)\times(e-x)-(b-e)^2$

Although the equation set forth above may be used to calculate the value of the comb factor for every pixel, and the comb factor value may be compared with a set constant threshold value to determine whether the pixel is a comb factor, then the frame type may be determined based on the total number of the comb factor pixels (i.e. the counter number). Such a method still may result in incorrect judgement. It is because the number of the comb factor is proportional to the difference of the top-field and the bottom-field. The proportional relationship of the difference is illustrated in FIG. 4. It is substantially a linear direct proportion. In other words, if an interlaced frame contains objects of a slow motion or a lower frequency, the field difference would also be small and the comb factor number also would be small. However, if video content is more complex, such as including complicated objects like leaves or stones, even if there is no time difference between the top-field and the bottom-field (i.e. progressive frame), the calculated comb factor number could be relatively large. Therefore to determine the frame type based on merely one constant threshold value could mistakenly treat an interlaced frame of a slow motion or a low frequency as a progressive frame; or mistakenly treat a progressive frame of a fast motion or a high frequency as an interlaced frame. As a result, the interlaced frame could be output without undergoing the deinterlacing process and video output quality may suffer.

SUMMARY OF THE INVENTION

The primary object of the invention is to provide a method for detecting video frame types by using adaptive thresholds to accurately determine whether a video frame is an interlaced frame or a progressive frame thereby to overcome the problem of incorrect judgement of the frame type that occurs to conventional methods that use a constant threshold value.

The method of the invention performs the initial determination based on video field difference, then dynamically adjusts the threshold value in the counter based on the field difference thereby to determine whether the frame in the video is an interlaced frame or a progressive frame. Therefore incorrect judgements resulting from the field difference may be eliminated, and accuracy of determining the frame type may be improved.

In order to achieve the foregoing object, the method of the invention includes: first, setting the counter to zero and inputting a frame F (n) at time field "n" at time instant "n", then calculating the field difference value of the frame at time field n; next, comparing with a set field difference upper bound value (Fi-th); when the field difference value is smaller than the upper bound value (Fi-th), dynamically setting the threshold value in the counter based on the field difference value; then calculating the comb factor number of the frame that is greater than the comb factor threshold value, and comparing with the set threshold value in the counter; determining whether the frame is an interlaced frame or a progressive frame; and determining whether to proceed deinterlacing process.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 1(a) is a schematic view of video outputs of an interlaced frame.

FIG. 1(b) is a schematic view of video outputs of a progressive frame.

DESCRIPTION OF THE PREFERRED EMBODIMENT

Figure 2:
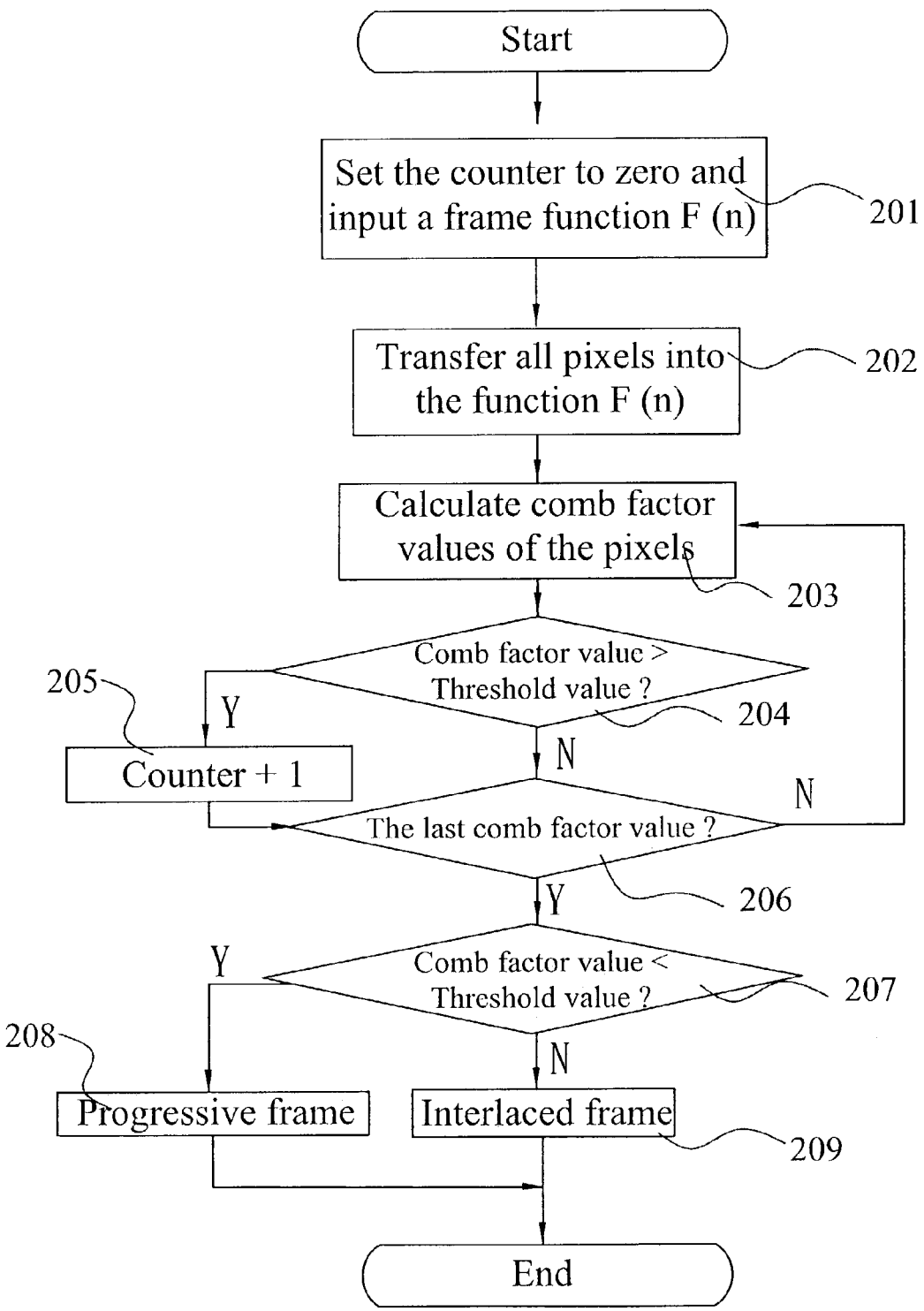
FIG. 2 is a process flow for determining frame type adopted a conventional detection technique.
Figure 3:
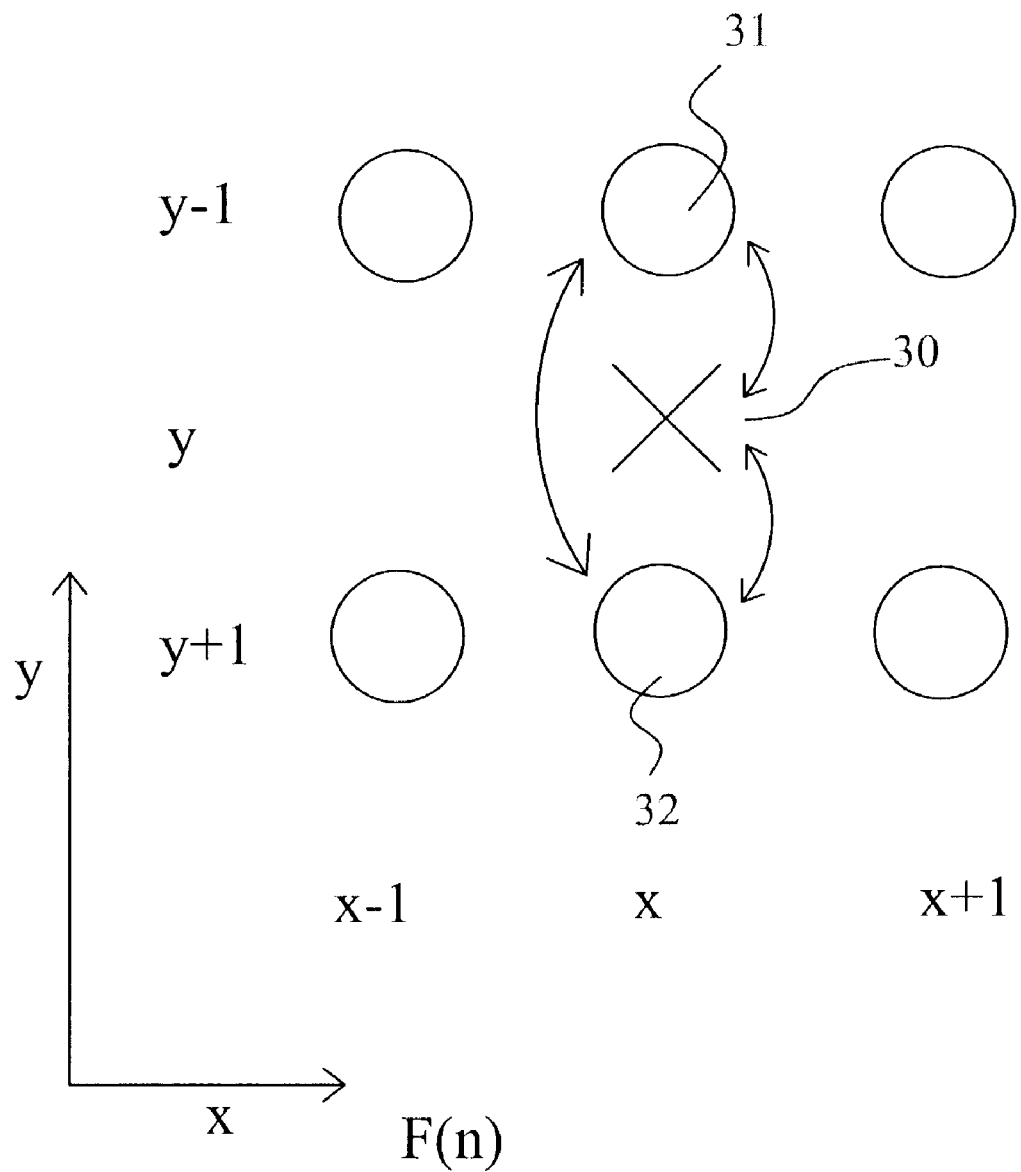
FIG. 3 is a schematic view for calculating comb factor value of a pixel of a frame.
Figure 4:
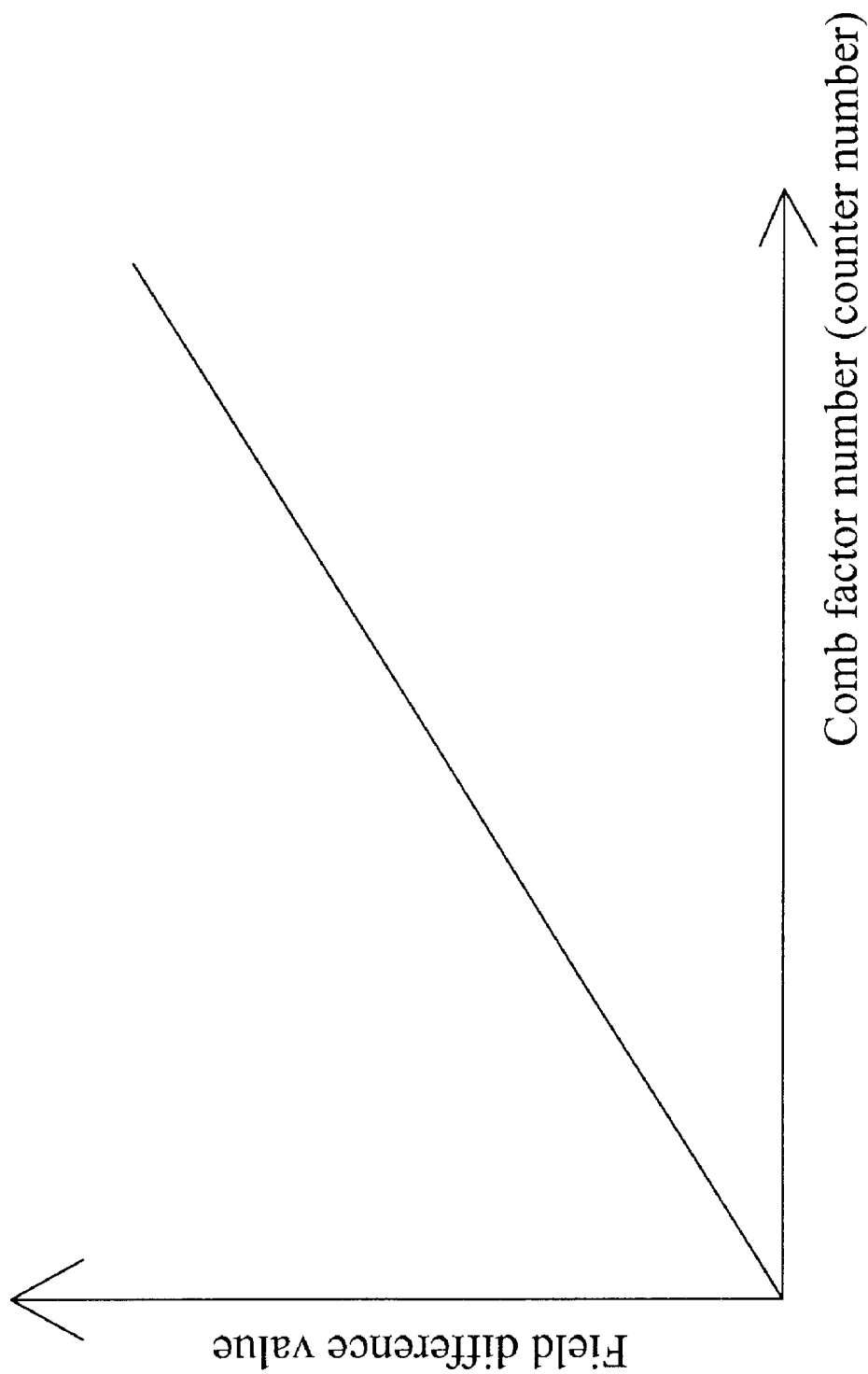
FIG. 4 is a chart showing the relationship between the comb factor number and the field difference value.

Refer to FIG. 4 for an embodiment of the method for detecting video frame types by using adaptive thresholds according to the invention. The method mainly includes the following steps:

first, proceeding step 401, setting the counter to zero, and inputting a frame function F (n). These processes are substantially same as the ones of the conventional method set forth above, thus details are omitted.

next, proceeding step 402, calculating and obtaining field difference value of the frame at time field n; the calculating equation is:

$$(FieldDiff) = \sum_{y=0}^{M/2} \sum_{x=0}^{N} |F(x, 2y, n) - F(x, 2y+1, n)|$$

where M and N are respectively the height and width of the frame, and F (x,2y,n) and F (x,2y+1,n) are respectively the pixel values in top-field and bottom-field.

proceeding step 403, comparing the field difference value with a set upper-bound value (Fi-th) of the field difference;

proceeding step 412 if the field difference value is greater than or equal to the set upper-bound value (Fi-th), and the frame is judged as an interlaced frame;

proceeding step 404 if the field difference value is smaller than the set upper-bound value (Fi-th), and dynamically adjusting the threshold value for the comb factor counter (the method of dynamical adjusting will be explained later);

proceeding step 405, transferring all pixels of the frame in the frame function F (n);

calculating comb factor values of all the pixels (step 406);

determining whether the comb factor value is greater than or equal to the comb factor threshold value (comb TH) (step 407);

increasing the counter by one if the comb factor threshold value (comb TH) is greater than or equal to the comb factor value (step 408);

proceeding step 409 if the comb factor threshold value (comb TH) is smaller than the comb factor value and determining whether the pixel is the last one;

proceeding step 410 if the pixel is the last one;

repeating step 406 if the pixel is not the last one and calculating the next comb factor value;

determining whether the counter value is small than or equal to the adjusted counter threshold value (step 410);

determining the frame is a progressive frame if the counter value is smaller than the adjusted counter threshold value (step 411);

determining the frame is an interlaced frame if the counter value is not smaller than the adjusted counter threshold value (step 412);

stopping the process.

Figure 5:
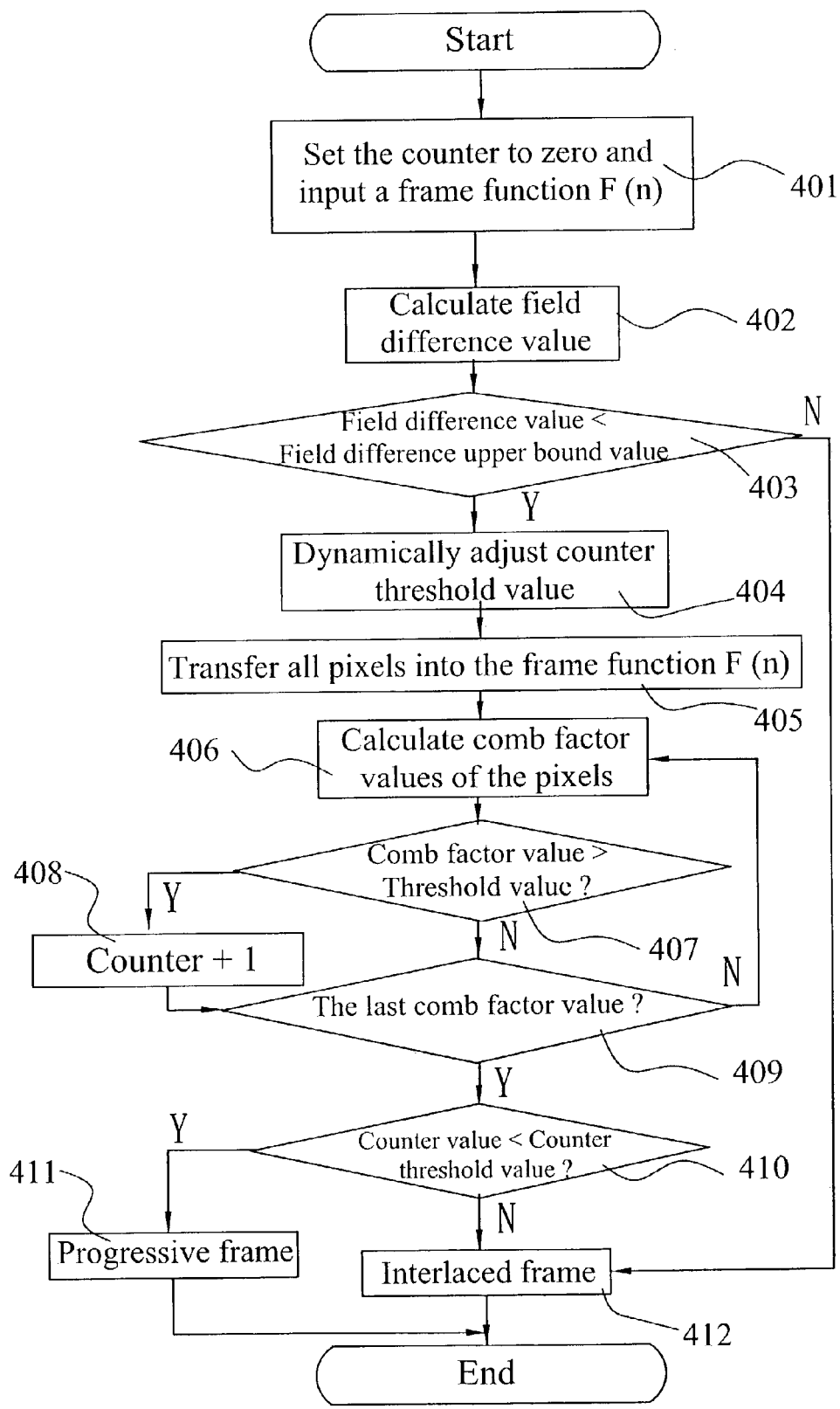
FIG. 5 is a process flow for determining frame type according to an embodiment of the invention.
Figure 6:
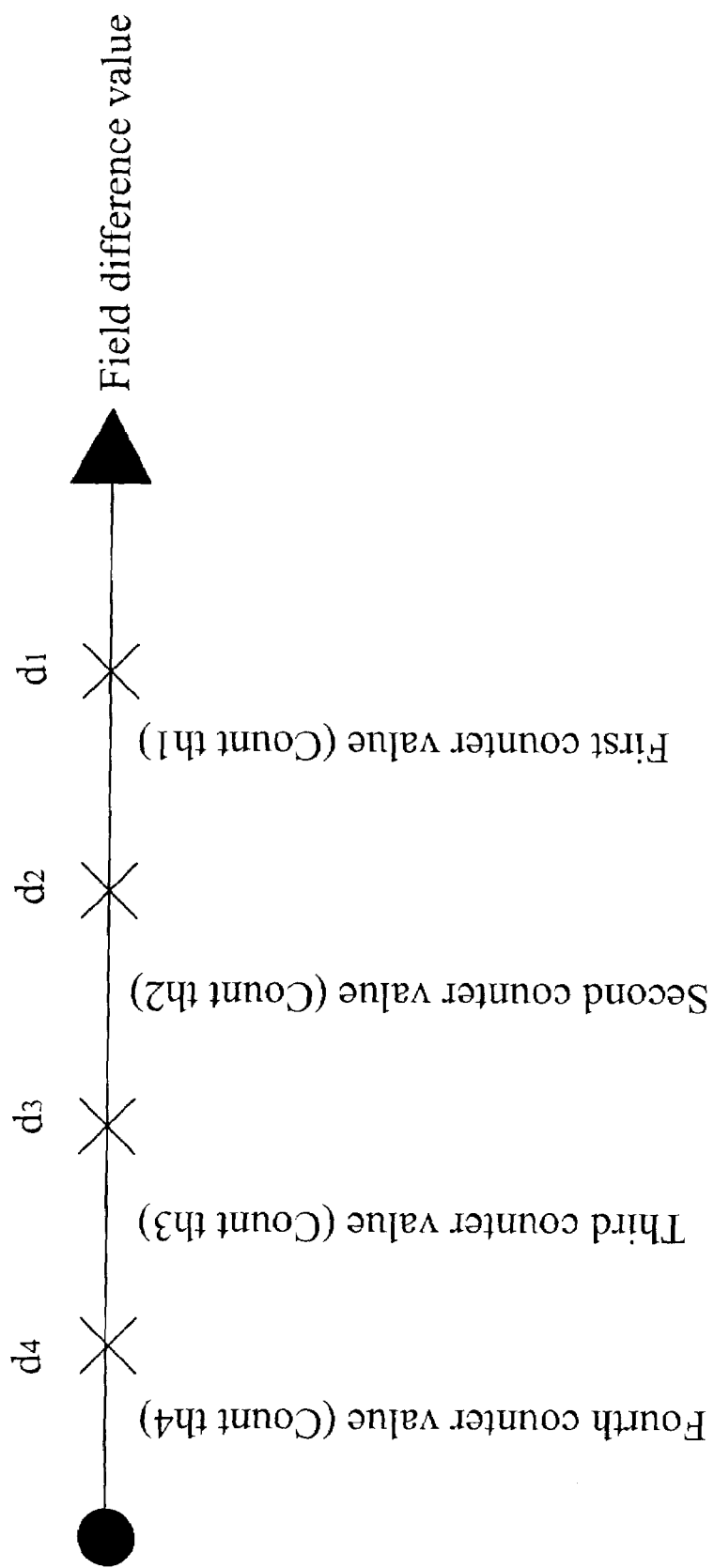
FIG. 6 is a schematic chart showing the field difference value being divided in four threshold values according to an embodiment of the invention.

Refer to FIGS. 5 and 6 for an embodiment of dynamically adjusting the counter threshold value at step 404. As shown in FIG. 5, the field difference value is substantially in a linear proportional relationship with the comb factor number. Hence the set upper-bound field difference value (Fi-th) may be divided into several numbers to form a plurality of ranges. In the embodiment, four ranges are formed as shown in FIG. 6. They are a first field difference value d1, which is equal to the set upper-bound field difference value (Fi-th), a second field difference value d2, a third field difference value d3, and a fourth field difference value d4. When the calculated field difference value is within the range of the first field difference value d1 and the second field difference value d2, the threshold value in the counter is dynamically adjusted to a first counter value (Count th1). When the calculated field difference value is within the range of the second field difference value d2 and the third field difference value d3, the threshold value in the counter is dynamically adjusted to a second counter value (Count th2). When the calculated field difference value is within the range of the third field difference value d3 and the fourth field difference value d4, the threshold value in the counter is dynamically adjusted to a third counter value (Count th3). When the calculated field difference value is within the range of the fourth field difference value d4 and zero, the threshold value in the counter is dynamically adjusted to a fourth counter value (Count th4).

By means of the method of the invention set forth above, first, the field difference value of a frame at time n is calculated and obtained, next compare the field difference value with an upper bound value of the field difference for determination, then the threshold value in the counter is dynamically adjusted to improve the judgement whether the frame is an interlaced frame or a progressive frame. As a result, accuracy of determining the frame type can be increased.

Furthermore comparing the field difference value with an upper-bound value gives a fast determination of the frame type, as for a progressive video frame, the field difference value will not exceed this upper-bond value Therefore, if the field difference value exceeds this upper-bond value, the video frame can be straightly classified as an interlaced frame without going through said step 404 to step 410 in FIG. 4.

While the preferred embodiment of the invention has been set forth for the purpose of disclosure, modifications of the disclosed embodiment of the invention as well as other embodiment thereof may occur to those skilled in the art. Accordingly, the appended claims are intended to cover all embodiments which do not depart from the spirit and scope of the invention.

What is claimed is:

1. A method for detecting video frame types with adaptive thresholds, comprising steps of:
   inputting a frame;
   calculating a field difference value of the frame at a time field;
   adjusting dynamically a threshold value of a counter based on the field difference value;
   calculating comb factor values of all pixels of the frame;
   determining whether the comb factor values exceed a comb factor threshold value, and increasing the counter by one if the comb factor values exceed the comb factor threshold value;
   determining the frame type based on the counter value and the adjusted counter threshold value; and
   ending the detecting.

2. The method for detecting video frame types with adaptive thresholds as set forth in claim 1, wherein the step of adjusting dynamically a threshold value of a counter based on the field difference value includes:
   comparing the field difference value with a set field difference upper bound value;
   determining the frame as an interlaced frame if the field difference value is greater than or equal to the set field difference upper bound value; and
   adjusting dynamically the threshold value of the counter if the field difference value is smaller than the set field difference upper bound value.

3. The method for detecting video frame types with adaptive thresholds as set forth in claim 1, wherein the step of calculating comb factor values of all pixels of the frame includes transferring the pixels into a frame function to calculate the comb factor values of the pixels.

4. The method for detecting video frame types with adaptive thresholds as set forth in claim 1, wherein the step of determining the frame type based on the counter value and the adjusted counter threshold value judges the frame as a progressive frame if the counter value is greater than the adjusted counter threshold value, and judges the frame as an interlaced frame if the counter value is smaller than the adjusted counter threshold value.

5. The method for detecting video frame types with adaptive thresholds as set forth in claim 1, wherein the steps of dynamically adjusting a threshold value of a counter based on the field difference value includes:
   dividing a field difference threshold value into a plurality of threshold values, every two neighboring threshold values forming a range corresponding to a counter value; and
   setting the corresponding counter threshold value based on the field difference value.

6. The method for detecting video frame types with adaptive thresholds as set forth in claim 5, wherein the upper-bound field difference threshold value is divided to a first field difference value, a second field difference value, a third field difference value, and a fourth field difference value; when the calculated field difference value is within the range of the first field difference value and the second field difference value, the counter threshold value is dynamically adjusted to a first counter value; when the calculated field difference value is within the range of the second field difference value and the third field difference value, the counter threshold value is dynamically adjusted to a second counter value; when the calculated field difference value is within the range of the third field difference value and the fourth field difference value, the counter threshold value is dynamically adjusted to a third counter value; when the calculated field difference value is within the range of the fourth field difference value and zero, the counter threshold value is dynamically adjusted to a fourth counter value.

* * * * *